US010320727B1

(12) United States Patent
Mesters et al.

(10) Patent No.: US 10,320,727 B1
(45) Date of Patent: Jun. 11, 2019

(54) MANAGING DOCUMENT FEEDBACK ON A SHARING SERVICE USING A MESSAGING CLIENT

(71) Applicant: Amazon Technologies, Inc., Seattle, WA (US)

(72) Inventors: Floor Mesters, The Hague (NL); Ivo van Doorn, The Hague (NL); Milo Oostergo, The Hague (NL)

(73) Assignee: Amazon Technologies, Inc., Seattle, WA (US)

( * ) Notice: Subject to any disclaimer, the term of this patent is extended or adjusted under 35 U.S.C. 154(b) by 825 days.

(21) Appl. No.: 14/571,139

(22) Filed: Dec. 15, 2014

(51) Int. Cl.
*H04L 12/58* (2006.01)
*G06F 3/0484* (2013.01)
*G06F 3/0482* (2013.01)
*G06F 17/24* (2006.01)
*G06F 17/22* (2006.01)

(52) U.S. Cl.
CPC ............ *H04L 51/08* (2013.01); *G06F 3/0482* (2013.01); *G06F 3/04842* (2013.01); *G06F 17/2235* (2013.01); *G06F 17/24* (2013.01)

(58) Field of Classification Search
CPC ....................................................... H04L 51/08
USPC ........................................................ 715/752
See application file for complete search history.

(56) References Cited

U.S. PATENT DOCUMENTS

| 6,766,321 | B2 * | 7/2004 | Sasaki ..................... G06Q 10/10 |
| 6,826,595 | B1 * | 11/2004 | Barbash ............ G06F 17/30899 |
| | | | 707/E17.119 |
| 7,970,850 | B1 | 6/2011 | Callanan et al. |
| 8,065,424 | B2 | 11/2011 | Foresti et al. |
| 2002/0065892 | A1 | 5/2002 | Malik |
| 2002/0198936 | A1 | 12/2002 | McIntyre et al. |
| 2003/0200268 | A1 | 10/2003 | Morris |
| 2004/0049696 | A1 | 3/2004 | Baker et al. |
| 2004/0186851 | A1 | 9/2004 | Jhingan et al. |
| 2004/0268246 | A1 * | 12/2004 | Leban ................. G06F 17/2247 |
| | | | 715/239 |

(Continued)

OTHER PUBLICATIONS

Adobe, "Acrobat Help / Starting a PDF review" Nov. 27, 2012, retrieved from https://web.arch ive.org/web/20121127040149/https://helpx.adobe.com/acrobat/using/starting-pdf-review.html, 2 pages.

(Continued)

*Primary Examiner* — Doon Y Chow
*Assistant Examiner* — Conrad R Pack
(74) *Attorney, Agent, or Firm* — Lee & Hayes, P.C.

(57) ABSTRACT

Functionality is disclosed herein for managing document feedback on a sharing service using a messaging client. Utilizing the technologies described herein, a file is associated with a message from an interface configured to compose the message. In addition, the interface is configured to receive a selection of one or more categories of feedback data. A category of feedback data is inserted into the message based on the selection. For example, comments associated with a section of the file may be displayed in the message. The feedback data, such as the comments, are retrieved from a locally stored file, a remotely stored file, a database and/or any other computing device storing the feedback data. Once the message is delivered to a recipient, a user interface may be configured to receive feedback data and communicate the received data to a remote data store.

14 Claims, 11 Drawing Sheets

(56) References Cited

U.S. PATENT DOCUMENTS

| | | |
|---|---|---|
| 2005/0234864 A1 | 10/2005 | Shapiro |
| 2005/0283461 A1 | 12/2005 | Sell et al. |
| 2006/0053380 A1 | 3/2006 | Spataro et al. |
| 2006/0184540 A1* | 8/2006 | Kung .................. G06F 17/3089 |
| 2006/0265390 A1 | 11/2006 | Aldrich et al. |
| 2007/0067332 A1 | 3/2007 | Gallagher et al. |
| 2007/0074270 A1* | 3/2007 | Meehan .................. G06F 21/10 726/2 |
| 2007/0088776 A1* | 4/2007 | Whear .................. G06Q 10/10 709/201 |
| 2007/0255792 A1 | 11/2007 | Gronberg |
| 2008/0077676 A1 | 3/2008 | Nagarajan et al. |
| 2008/0098294 A1* | 4/2008 | Le .......................... G06F 17/241 715/230 |
| 2008/0168343 A1* | 7/2008 | Doganata .............. G06F 17/241 715/230 |
| 2009/0013037 A1* | 1/2009 | Bodmer ............... G06Q 20/382 709/203 |
| 2009/0089378 A1 | 4/2009 | Maresh |
| 2009/0113002 A1 | 4/2009 | Zellner et al. |
| 2010/0070594 A1 | 3/2010 | Yoshimura |
| 2010/0082713 A1 | 4/2010 | Frid-Nielsen et al. |
| 2010/0217818 A1 | 8/2010 | Wu |
| 2010/0241711 A1 | 9/2010 | Ansari et al. |
| 2010/0318893 A1* | 12/2010 | Matthews ............. G06F 17/241 715/230 |
| 2011/0099154 A1 | 4/2011 | Maydew et al. |
| 2012/0278405 A1 | 11/2012 | Costenaro et al. |
| 2012/0284344 A1* | 11/2012 | Costenaro ............. G06F 17/241 709/206 |
| 2013/0212112 A1 | 8/2013 | Blom et al. |
| 2013/0226975 A1 | 8/2013 | Lee |
| 2013/0332849 A1 | 12/2013 | Santos |
| 2014/0068401 A1 | 3/2014 | Kirigin |
| 2014/0165176 A1 | 6/2014 | Ow |
| 2014/0188815 A1* | 7/2014 | Mentz .................... G06Q 10/06 707/689 |
| 2014/0359085 A1 | 12/2014 | Chen |
| 2015/0095430 A1 | 4/2015 | Kaushik et al. |
| 2015/0134751 A1 | 5/2015 | Meyers, Jr. et al. |
| 2015/0186398 A1 | 7/2015 | Yan et al. |
| 2015/0271117 A1 | 9/2015 | Massand |
| 2015/0350134 A1 | 12/2015 | Yang et al. |
| 2016/0094499 A1 | 3/2016 | Uraizee et al. |

OTHER PUBLICATIONS

Office action for U.S. Appl. No. 14/570,850, dated Jan. 29, 2018, Mesters, "Setting Sharing Options for Files Using a Messaging Client", 23 pages.

Office action for U.S. Appl. No. 14/570,850, dated Oct. 5, 2016, Mesters et al., "Setting Sharing Options for Files Using a Messaging Client", 20 pages.

Office action for U.S. Appl. No. 14/571,011, dated Dec. 28, 2017, Mesters, et. al., "Uploading Attachments to Sharing Service Using a Messaging Client ", 24 pages.

Office action for U.S. Appl. No. 14/571,011, dated Jul. 7, 2017, Mesters, et. al., "Uploading Attachments to Sharing Service Using a Messaging Client", 27 pages.

"Simplify Attachments with Box for Outlook", 2011, retrieved on May 13, 2017 from https://blog.box.com/blog/simplify-attachments-with-box-for-outlook/, 2011, 2 pages.

"Starting a PDF review", Adobe Acrabat—Adobe Support, Retrieved from <<https://adobe.com/acrobat/using/statting-pdf-review.html>>, Jun. 2013, 7 pages.

* cited by examiner

FEEDBACK OPTIONS

DISPLAY OPTIONS  {401A}
- ● DISPLAY FEEDBACK PREVIEW
- ○ DISPLAY FEEDBACK EXPIRATION INFORMATION
- ○ DISPLAY AMOUNT OF FEEDBACK GIVEN TO DATE
- ○ DISPLAY USERS ASSOCIATED WITH FEEDBACK

COMMUNICATION OPTIONS  {401B}
- ○ ATTACH FEEDBACK DATA
- ○ ALLOW FEEDBACK TO BE PROVIDED FROM EMAIL INTERFACE
- ○ DO NOT ALLOW FEEDBACK FROM EMAIL INTERFACE
- ● ALLOW FEEDBACK: NO EXPIRATION
- ○ ALLOW FEEDBACK: EXPIRES ON [06/06/2014] [05:30 PM]

[OK]  [CANCEL]

MANAGING DOCUMENT FEEDBACK ON A SHARING SERVICE USING A MESSAGING CLIENT

BACKGROUND

Many users depend on electronic mail ("email") to send messages and share files. In some scenarios, users may add attachments to emails to share files with other users. Given the size of most attachments in addition to the fact that some users exchange a large number of emails per day, it can be appreciated that existing practices utilizing email attachments may demand a significant level of communication and storage resources. In addition, the use of email attachments creates complex scenarios for users when it comes to version control of shared files. For instance, it may be difficult for some users to identify the most recent version of a document particularly when multiple users are communicating individual versions of the document on different email threads. To address some of the drawbacks created by the use of email attachments, some users share data by storing files on a central server and sending associated links in emails.

Although some systems provide different mechanisms for sharing files with messages, existing systems are limited in how data associated with the files are shared. For instance, some files, such as a word processing document or an image, allow users to embed data, such as comments or feedback, within the file. When such files are communicated in existing systems, users are usually required to take a number of actions to download, open and navigate through the files to access or modify the embedded data. Given the number of steps that may be needed to access or modify the embedded data, existing systems may provide less than an optimal user experience.

BRIEF DESCRIPTION OF THE DRAWINGS

FIG. 4 is a screen diagram showing an illustrative graphical user interface that displays data relating to setting display and communication options for feedback data to be displayed in the message;

DETAILED DESCRIPTION

Figure 1:
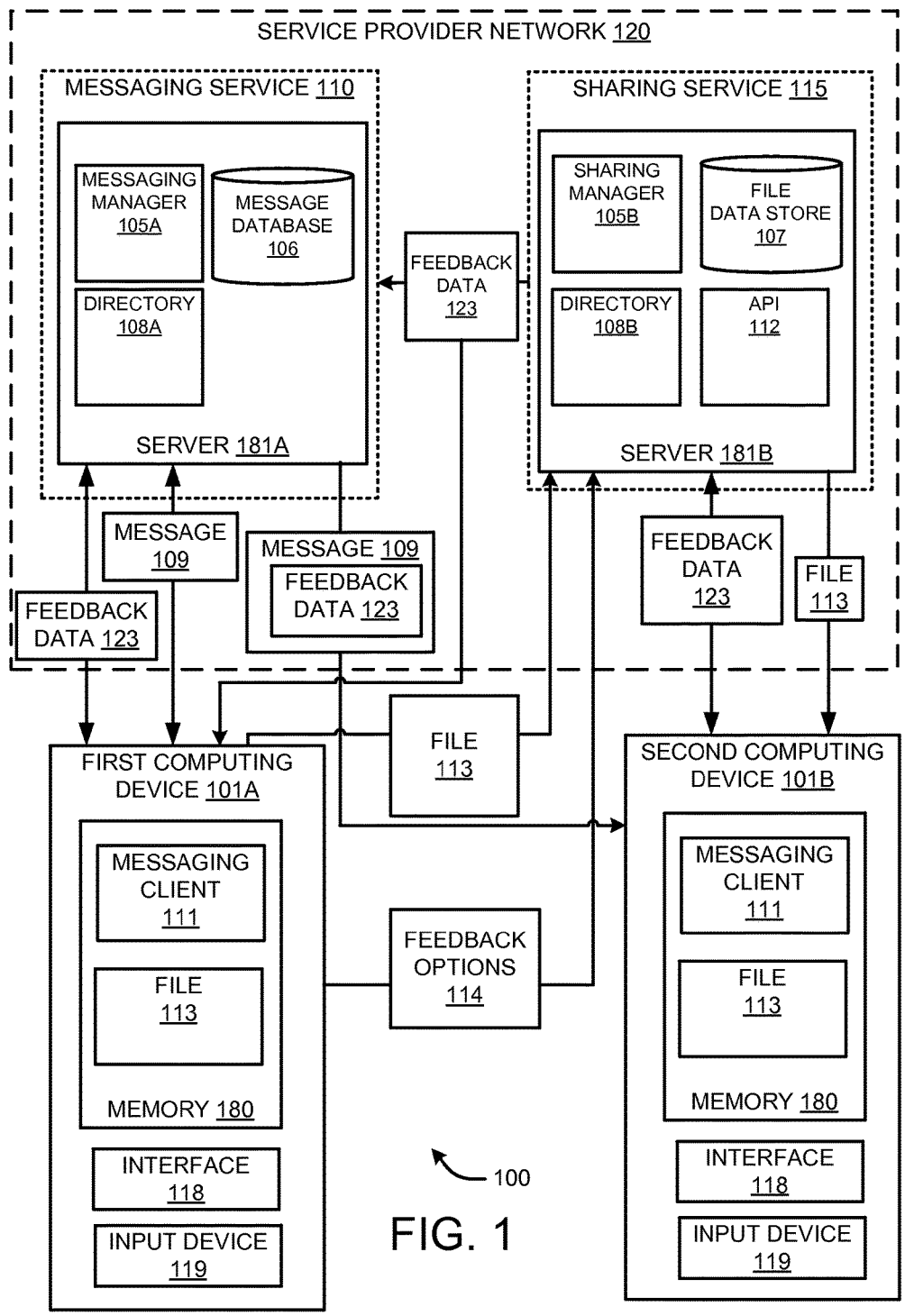
FIG. 1 is a block diagram depicting an illustrative framework that enables techniques for managing document feedback on a sharing service using a messaging client.

The following detailed description is directed to concepts and technologies for managing document feedback on a sharing service using a messaging client. Utilizing the technologies described herein, a file is associated with a message from an interface configured to compose the message. In addition, the interface is configured to receive a selection of feedback options for managing the display and communication of feedback data associated with the file. In some configurations, the feedback options may include the selection of one or more categories of feedback data. Selecting a category of feedback data may cause the display of the selected category of feedback data in the interface displaying the message. For example, selecting comments associated with the file may cause the comments stored in the file to be displayed in the interface displaying the message.

In some configurations, the feedback options may also include the selection of one or more communication options for the feedback data. In such configurations, based on the selection of one or more communication options, the interface may include a data entry field for receiving and communicating feedback data. Once the message is delivered to a recipient, an interface presented to the recipient may display the message, the selected category of feedback data, and/or the data entry field for receiving feedback data. Feedback data received by the data entry field may be communicated to a remote computing device for integration into the file and/or one or more data stores. Using an implementation of the technologies disclosed herein, users may share files and manage the display and communication of associated feedback data from a message interface without the need to interact with different controls or interfaces of multiple services.

In some configurations, individual categories of feedback data may include comments associated with a file, data identifying users who provided comments, data indicating one or more deadlines or expiration dates. Other categories of feedback data, for example, may include numbers, tables and/or charts showing frequency data, trends or other data describing activity related to the feedback data. The categories of the feedback data may be arranged in the message according to the specified feedback options, which may be received by an author of the message.

In some configurations, when a category of feedback data is selected, the feedback data may be retrieved from a locally stored file, a remotely stored file, a record of a database and/or any other computing device storing the feedback data. For example, upon the selection of a category of feedback data, such as a category including comments, the feedback data may be retrieved from a locally stored file. In some configurations, the feedback data may be retrieved from a remotely stored file, such as a file stored in a data store of a sharing service. The received feedback data may be inserted into the message being composed by the author.

In some configurations, the feedback data may be delivered as an attachment with the message. For example, if a selected feedback option indicates that a category of feedback data is to be inserted into the message, the feedback data may be delivered with the message, e.g., as an attachment, to one or more designated recipients. The recipients of the message may view the feedback data by accessing the feedback data that is attached to the message.

In some configurations, hyperlinks ("links") for accessing the feedback data may be used to communicate the feedback data with the message. For example, if a selected feedback option indicates that feedback data is to be inserted into the message, one or more links providing access to the feedback data may be inserted into the message. The recipients of the message may access the feedback data by selecting the links inserted in the message. By the use of the links, the feedback data may be retrieved by the recipients from one or more remote resources storing the feedback data, such as a sharing service.

In some configurations, a framework includes a messaging service and a sharing service. A messaging client may operate in conjunction with the messaging service to cause the display of a user interface ("UI") that may be utilized by a user composing a message. The UI may also include controls configured to select a file to be associated with the message. The file may be stored by the sharing service and/or by a local computing device. When the user selects the stored files to be shared (e.g., with the recipient of the message or some other users), the messaging client communicates the selected files to the sharing service for storage. The sharing service may then generate one or more links operative to provide access to the selected files stored at the sharing service. In other configurations, the selected file may attached to the message.

The UI may also include controls configured to receive a selection of feedback options for managing the display and communication of feedback data associated with the file. The feedback options may include the selection of one or more categories of feedback data to be inserted into the message. As discussed briefly above, one category of feedback data may include comments associated with text of the file. If the one category is selected, the comments associated with text of the file may be inserted or integrated in the message. Once the message is delivered to a recipient, a user interface may display the message and at least a portion of the feedback data based on the selected feedback options. In addition, based on the selection of one or more communication options, the UI displayed to the recipient may be configured to receive feedback data in a data entry field, such as an editable text field. Any input received by the data entry field may be communicated to a remote computing device, such as a sharing service, for integration of the input into the file and/or one or more data stores. Such features may allow a recipient of the message to view and input feedback data that is stored in one or more files associated with the message. Additional details regarding the various components and processes described above for providing enhanced file sharing controls in a messaging client will be presented below with regard to FIGS. 1-10.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances and the like. As mentioned briefly above, the technologies described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which may be referred to herein as a "FIG." or "FIGS.").

FIG. 1 is a block diagram depicting an illustrative framework 100 in which display and communication options for document feedback may be specified using a messaging client. In some configurations, the framework 100 includes a messaging service 110 and a separate sharing service 115. In other configurations, a single service or more than two services might be utilized to provide the functionality described herein as being provided by the messaging service 110 and/or the sharing service 115. The messaging service 110 and the sharing service 115 may respectively manage the communication, sharing, and storage of messages and files between computing devices, such as a first computing device 101A and a second computing device 101B (also referred to herein generically and collectively as "computing devices 101").

For illustrative purposes, two computing devices 101 are shown in FIG. 1. Fewer or more computing devices 101 might be used in other implementations of the described techniques. According to some configurations, the messaging service 110, the sharing service 115 and the computing devices 101 are interconnected through one or more local and/or wide area networks (not shown). The functionality described herein may be provided by a service provider operated network-based distributed computing environment (which may be referred to herein as a "service provider network" 120). In some configurations, the messaging service 110 and/or the sharing service 115 may be implemented within the service provider network 120. The sharing service can also be referred to as a "collaboration service," since at least some embodiments of the sharing service can allow users to work together on a document. For example, users can exchange different versions of a document, while providing comments on the document.

As described in more detail below, the service provider network 120 may include a collection of rapidly provisioned and, potentially, released computing resources. The computing resources may include a number of computing, networking and storage devices in communication with one another. In some configurations, the computing resources may correspond to physical computing devices. In other configurations, the computing resources may correspond to virtual machine instances implemented by one or more physical computing devices. In still other configurations, computing resources may correspond to both virtual machine instances and physical computing devices. The operator of the service provider network 120 may charge for the use of computing resources.

In some configurations, the messaging service 110 may be provided by one or more computing devices, such as server computing devices, or some other computing device or devices configured to perform the techniques described herein. For illustrative purposes, configurations of the messaging service 110 may include a server 181A storing a messaging manager 105A, a message database 106 and a directory 108A. The messaging manager 105A may access permission data stored in the directory 108A for controlling user access to messages and other data stored in the message database 106. The messaging manager 105A may be configured to manage the communication of messages 109 between one or more computing devices 101.

The sharing service 115 may be provided by one or more computing devices, such as server computing devices, or some other computing device or devices configured to perform the techniques described herein. For illustrative purposes, configurations of the sharing service 115 may include a server 181B storing a sharing manager 105B, a file data store 107 and a directory 108B. The sharing manager 105B may access permission data stored in the directory 108B for controlling user access to files and other data stored in the file data store 107. For illustrative purposes, the directory 108A of the messaging service 110 and the directory 108B of the sharing service 115 may be referred to herein collectively and generically as a "directory 108" or "directories 108." The sharing manager 105B may be configured to manage the communication of data associated with the files 113 between one or more computing devices 101 and/or services, such as the messaging service 110.

In some configurations, the data associated with the files 113 may include feedback data 123. There may be a number of categories of feedback data 123, which may include comments, data identifying users who provided comments, data indicating one or more deadlines or expiration dates. Other categories of feedback data, for example, may include numbers, tables and/or charts showing frequency, trends or other data describing activity related to the feedback data. As will be described in more detail below, selected categories of the feedback data 123 may be arranged in the message 109 according to specified feedback options 114 received by a user, such as an author of the message 109.

In addition, as described in more detail below, the messaging service 110 and the sharing service 115 may coordinate through one or more communication interfaces to manage the communication of messages 109 and files 113 via a message client interface.

The computing devices 101 may each include memory 180 storing a file 113 and a messaging client 111. The computing devices 101 may also include a display interface 118 and an input device 119. The messaging client 111 may be configured to communicate with the messaging service 110 to receive, compose and send messages 109. In some examples, the messaging client 111 of each computing device 101 may be configured to instruct the sharing service 115 to store of one or more files, such as the file 113. The messaging client 111 may be in the form of a stand-alone application or any other application or software module having features that interact with a user of the messaging service 110 and the sharing service 115 via one or more devices, such as the input device 119 and the display interface 118. The input device 119 may be any device, such as a keyboard, and/or the display interface 118, which may include a touch-enabled screen configured to receive gestures from one or more users.

In some examples, the messaging service 110 and/or the messaging client 111 may cause the display of a message interface on the first computing device 101A. The message interface may include an editable text field for receiving text for a message 109. In addition, the message interface may include controls for associating a file (e.g. file 113 and/or a file stored by the sharing service 115) with the message 109. In particular, a user may select one or more files and associate the selected files with the message 109. Upon receiving the selection of the one or more files 113, the first computing device 101A may communicate one or more selected files to the sharing service 115. The sharing service 115 may then generate one or more links that can be utilized to access the selected files stored by the sharing service 115. The sharing service 115 may communicate the one or more links to the messaging service 110 and/or the messaging client 111 where the one or more links are inserted or integrated into the message 109.

In some scenarios, the one or more selected files 113 may not be stored by the sharing service 115, or the files 113 stored on the sharing service 115 may not include current versions of the one or more selected files 113. In such scenarios, one or more modules, such as the sharing manager 105B, may determine if the sharing service 115 is storing a current version of the one or more selected files. If it is determined that the one or more selected files are not stored at the sharing service 115 or if the sharing service 115 is not storing a current version of the one or more selected files 113, the first computing device 101A may communicate one or more selected files to the sharing service 115. The first computing device 101A may cause any computing device storing the one or more selected files 113 to communicate the one or more selected files 113 to the sharing service 115. In some cases, the sharing service 115 might access a local storage of the first computing device 101A to retrieve the one or more selected files 113. Although this illustrative example utilizes the sharing manager 105B, any other module or combination of modules may be used. For instance, network application programming interfaces ("APIs") of the sharing service 115 may be accessed by any module, such as the messaging client 111, to implement the techniques disclosed herein.

If it is determined that the sharing service 115 is storing a current version of the selected files 113, the first computing device 101A may communicate data identifying the selected files to the sharing service 115. For instance, the first computing device 101A might transmit data that identifies the selected files. In configurations where the sharing service 115 generates the links for the selected files 113, the sharing service 115 may utilize the received file identifier to generate the links operative to provide access to the selected files 113. The sharing service 115 may communicate the links to the messaging service 110 and/or the messaging client 111 where the links are inserted or integrated into the message 109.

In some configurations, the messaging service 110 and/or the messaging client 111 may obtain the links that can be utilized to access the selected files 113 stored by the sharing service 115. The messaging service 110 and/or the messaging client 111 may integrate the generated links into the message 109 without user interaction. As shown in FIG. 1, if the links are generated at the sharing service 115, the links may be communicated from the sharing service 115 to the messaging service 110, allowing the messaging service 110 to integrate the link into the message 109. In addition, or alternatively, the one or more links 122 may be communicated from the sharing service 115 to the messaging client 111 of a computing device 101, allowing the messaging client 111 to integrate the links into the message 109.

Although these examples involve the use of one or more links, it can be appreciated that other data for identifying, locating and/or providing access to stored files may be utilized by the techniques described herein. For instance, an identifier associated with a stored file 113, or any other access data suitable for providing access to the stored files, may be communicated from the sharing service 115 to the messaging service 110 and/or the messaging client 111. Once the identifier associated with a stored file 113 is communicated, the messaging service 110 and/or the messaging client 111 insert or integrate the identifier into a message 109. Any known technology for inserting or integrating an identifier that it configured to provide access to the one or more selected files 113 may be used with techniques disclosed herein. In addition, in some configurations, the messaging service 110 and/or the messaging client 111 may receive and utilize the identifier or other data from the sharing service 115 to generate the one or more links at the client computing device 101 and/or at the server 181A of the messaging service 110.

The messaging client 111 may be configured to display an interface, such as a user interface ("UI") that may be utilized by the user composing the message 109 to set feedback options 114, also referred to herein as "specified options." The feedback options 114 may indicate a selection of one or more categories of feedback data 123 (referred to herein as "selected feedback data") to be inserted into the message 109. In addition, as will be described in more detail below, the feedback options 114 may indicate how feedback data 123 may be communicated between one or more computing devices.

In some configurations, the messaging client 111 might receive the feedback options 114 using some other mechanism. For example, the messaging client 111 might be configured to receive voice data that specifies the feedback options 114. According to some configurations, the UI is configured to receive a selection of feedback options for managing the display and communication of feedback data.

Based on the selection of one or more categories of feedback data 123, at least a portion of the feedback data 123 are retrieved from one or more computing devices, such as the sharing service 115. The retrieved feedback data 123 is then inserted into the message 109 based on the selected categories of feedback data 123. For example, if one category of feedback data, such as comments associated with text of the selected file 113, is selected, at least a portion of the comments may be inserted in the message 109. As will be described in more detail below, the categories of feedback data 123 that may be selected and inserted into the message 109 may include comments associated with a file 113, data identifying users who provided comments, data indicating one or more deadlines or expiration dates. Other categories of feedback data, for example, may include numbers, tables and/or charts showing frequency data, trends or other data describing activity related to the feedback data 123. The categories of the feedback data 123 may be arranged in the message according to the specified feedback options received by a user, such as an author of the message 109.

When a user selects a control to send the message 109, the message 109 including the link to the file might be communicated from the first computing device 101A to the second computing device 101B. The selected feedback data 123 or links allowing access to the selected feedback data 123 may be delivered with the message 109. The communication of the message 109 may be processed by the messaging service 110 or any other service that is configured to communicate messages.

Once delivered, the message 109, the link to the file 113, the feedback data 123 and/or links to the feedback data 123 may be displayed on the interface 118 of the second computing device 101B. The messaging client 111 of the second computing device 101B may generate a UI that may display the message 109 and at least a portion of the feedback data 123 based on the specified feedback options. If links to the feedback data 123 are inserted into the message 109, a user of the second computing device 101B may select the link included in the message 109 to initiate the communication of the feedback data 123 from the sharing service 115 to the second computing device 101B.

In addition, based on the specified feedback options, the UI displayed on the interface 118 of the second computing device 101B may be configured to receive feedback data 123, which may involve the use of a data entry field. The feedback data 123 received by the data entry field may be communicated to a remote computing device, such as a sharing service 115, for integration of the received feedback data 123 into the file 113 stored in a file data store 107, a directory 108B and/or one or more data stores.

According to some configurations, the sharing service 115 exposes one or more APIs, such as the API 112. The API 112 can be accessed by various devices in communication with the sharing service 115 to access the functionality for setting options and configurations for the messaging client 111. The API 112 may be configured to support various protocols for various devices. In addition, the API 112 may be used to communicate data, such as the file 113 feedback options 114 and/or feedback data 123, between the sharing service 115 and other computing devices, such as the messaging service 110, the first computing device 101A or the second computing device 101B.

The techniques described herein enable users to associate one or more selected files 113 with a message 109 that are to be shared with one or more other users from a single message client interface. In addition, as will be described in more detail below, techniques described herein enable users to set display and communication options for feedback data 123 associated with selected files 113. Using an implementation of the technologies disclosed herein, users may share files and manage the communication of associated feedback data 123 from a message interface without the need to interact with different controls or interfaces of multiple services.

Figure 2A:
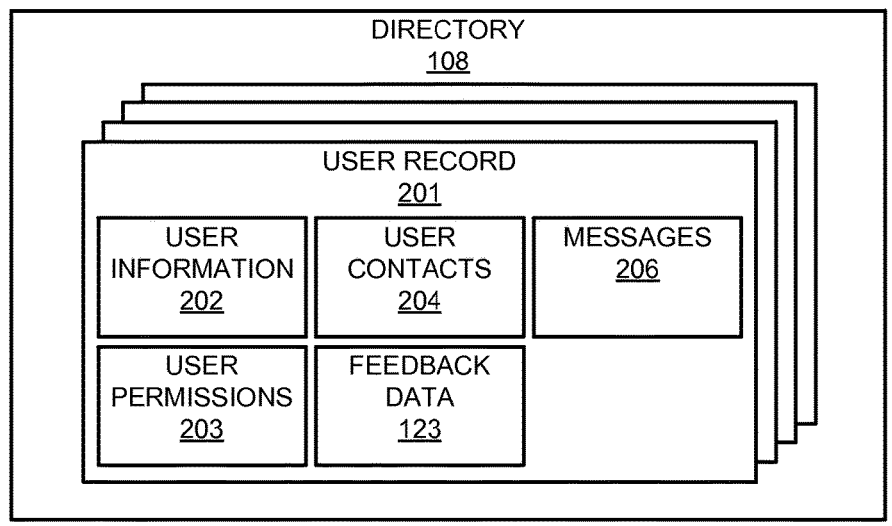
FIG. 2A is a block diagram depicting a directory.
Figure 2B:
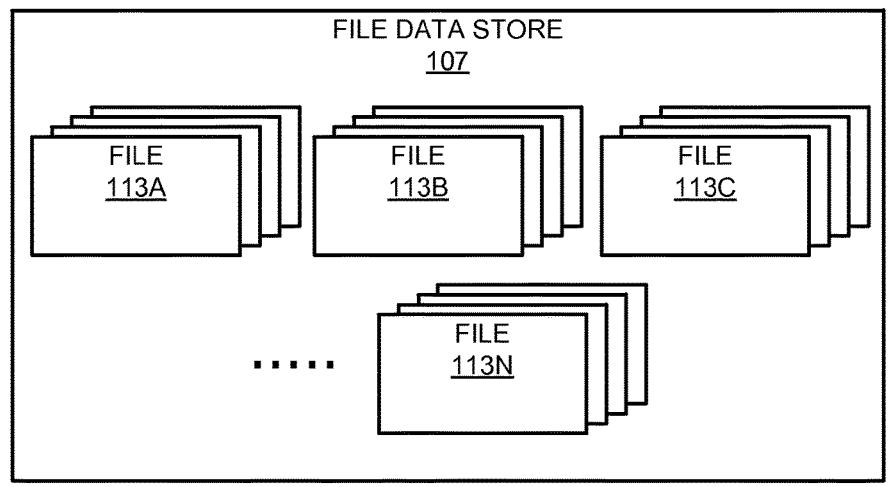
FIG. 2B is a block diagram depicting a file data store.

FIG. 2A is a block diagram depicting a directory 108 and FIG. 2B is a block diagram depicting the file data store 107 that might be utilized by the messaging service 110 and/or the sharing service 115. In some configurations, the directory 108 illustrated in FIG. 2A may include a number of records for defining access rights and permissions for users and/or identities accessing data stored by the sharing service 115 and possibly by the messaging service 110. As illustrated in FIG. 2A, an individual user record 201 may include the storage and/or association with different types of data, including, but not limited to user information 202, user permissions 203, user contacts 204, and feedback data 123. In some configurations, the user information 202 may store general identification information such as a user's name, email address, phone number and other contact information.

Although this example shows feedback data 123 being stored in a user records 201, the feedback data 123 may be stored in other locations, such as the directories 108 of the messaging service 110 and/or the sharing service 115. In addition, the feedback data 123 may be embedded in a file 113 stored by any computing device. The feedback data 123 may also be stored by a database or in the memory of any computing device.

The user permissions 203 may contain one or more data structures for defining access rights to individual records, emails or files or other data. According to some examples, data defining access rights may be based on a per user and per record basis. Thus, access to individual files, directories, emails, feedback data entries or other data may be independently controlled by the user permissions 203. For illustrative purposes, individual feedback data entries refer to individual comments or individual values, such as a number indicating the number of comments that are included in a file 113. The user contacts 204 may include a list of email addresses, phone numbers and identification information for other users. In some configurations, the user record 201 may include user feedback 205, which may include comments, notes and other data associated with files 113 stored in the file data store 107.

In some configurations, the directory 108 may include more or fewer types of data. In addition, for the sharing service 115, the directory 108 may contain a subset of the data types shown in the example of FIG. 2A. For instance, the directory 108B of the sharing service 115 may only include and/or utilize the user information 202 and user permissions 203.

The file data store 107 illustrated in FIG. 2B may include the storage of files 113A-113N, which are also referred to herein individually and generically as a "file 113" or "files 113." In some configurations, the file data store 107 may store different versions for each file 113A-113N, allowing users to select, edit, communicate and/or process newer or older versions of each file 113. In some configurations, among many other features, the file data store 107 may also store other types of data, such as the user feedback 205. In such configurations, the user feedback 205 may be stored in the files, or in other data fields.

In some configurations, the files 113, which may be in the form of a document generated by a word processing application, have one or more structures that allow users to add one or more categories of feedback data 123. In some configurations, the individual entries of feedback data 123 are associated with specific sections of the file or text included in the file 113. There may be a number of different categories of feedback data 123. For example, the categories of feedback data 123 may include comments associated with the file 113, data identifying users who provided comments, data indicating one or more deadlines or expiration dates. Other categories of feedback data 123, for example, may include numbers, tables and/or charts showing frequency data, trends or other data describing activity related to the feedback data 123. For example, the feedback data 123 may also include time stamps for individual comments or other entries.

Turning now to FIGS. 3A-6, different examples of graphical user interfaces are illustrated as screen diagrams that display information relating to techniques for managing feedback data 123 on a sharing service 115 using an interface of the messaging client 111. In addition, the examples disclosed herein provide techniques for setting display and communication options for feedback data 123 associated with files associated with a message 109. The screen diagrams presented are for illustrative purposes only, and are not intended to be limiting. For example, other visual interface as well as non-visual interfaces (e.g., voice, touch) might be utilized to perform the functionality described herein.

Figure 3A:
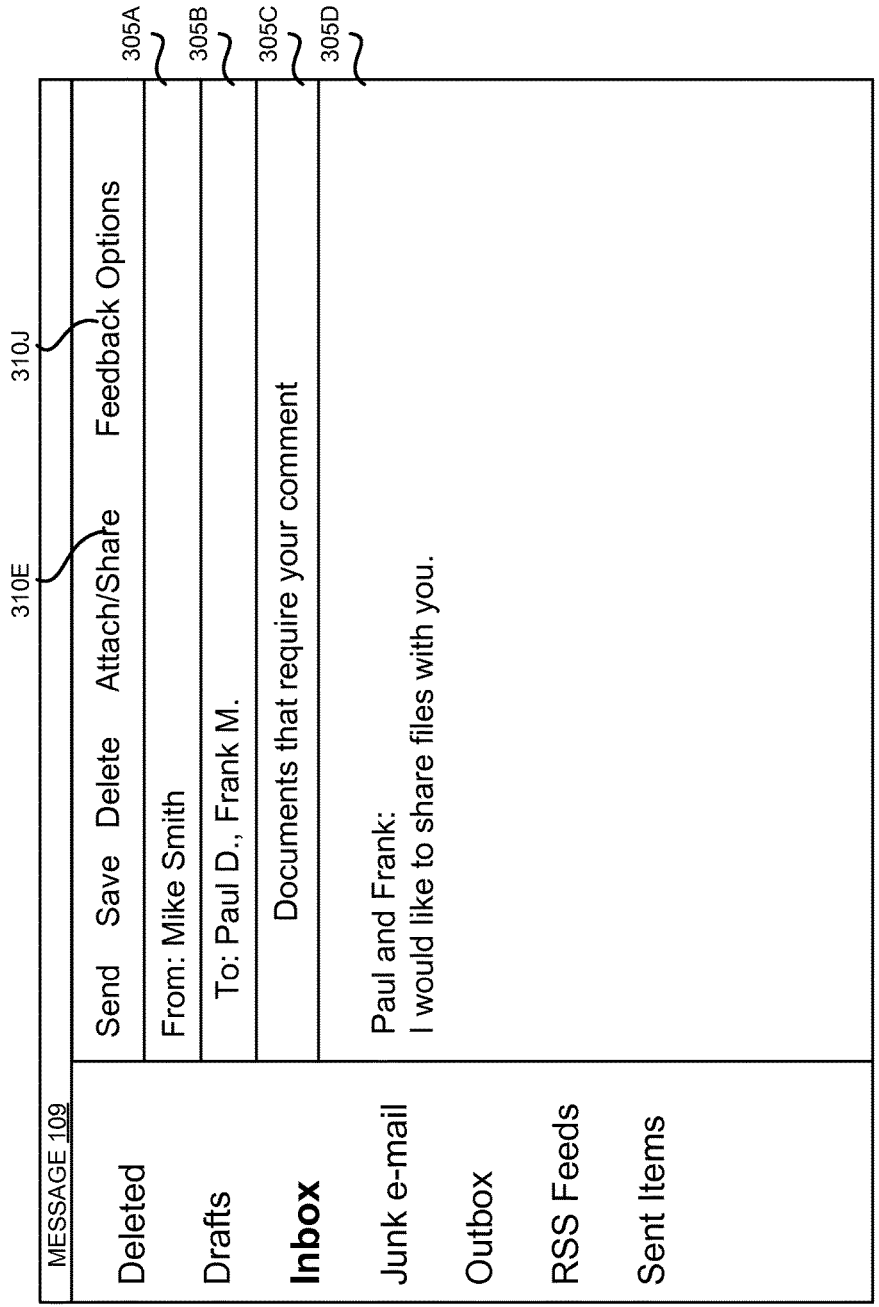
FIG. 3A is a screen diagram showing an illustrative graphical user interface that is configured to receive and process data for composing a message.

FIG. 3A is a screen diagram showing an illustrative graphical UI 300 that displays data relating to techniques for controlling the communication and storage of files 113 to a sharing service 115 while composing a message 109. The UI 300 may be generated by the messaging client 111, shown in FIG. 1, and presented on a computing device, such as the computing device 101A or 101B by an application, such as a web browser application.

As illustrated in FIG. 3A, the UI 300 includes a display of the message 109 being composed. In the current example, the UI 300 includes a "from" UI element 305A showing the sender of the message 109, a "recipient" UI element 305B for specifying the recipients of the message 109, a "subject" UI element 305C for specifying the subject of the message 109, message area UI element 305D for entering text of the message 109, and a "share" UI element 310E for specifying one or more files 113 to share. In addition, the UI 300 includes a "feedback options" UI element 310J for specifying the display and communication options for feedback data associated with the one or more files 113.

A user may select the "attach/share" UI element 310E to share one or more files 113. In response to receiving a user the selection of the "attach/share" UI element 310E, the messaging client 111 may generate one or more UI elements to display stored files 113 to the user and provide controls for the user to select one or more files 113 from the displayed list of files 113.

Figure 3B:
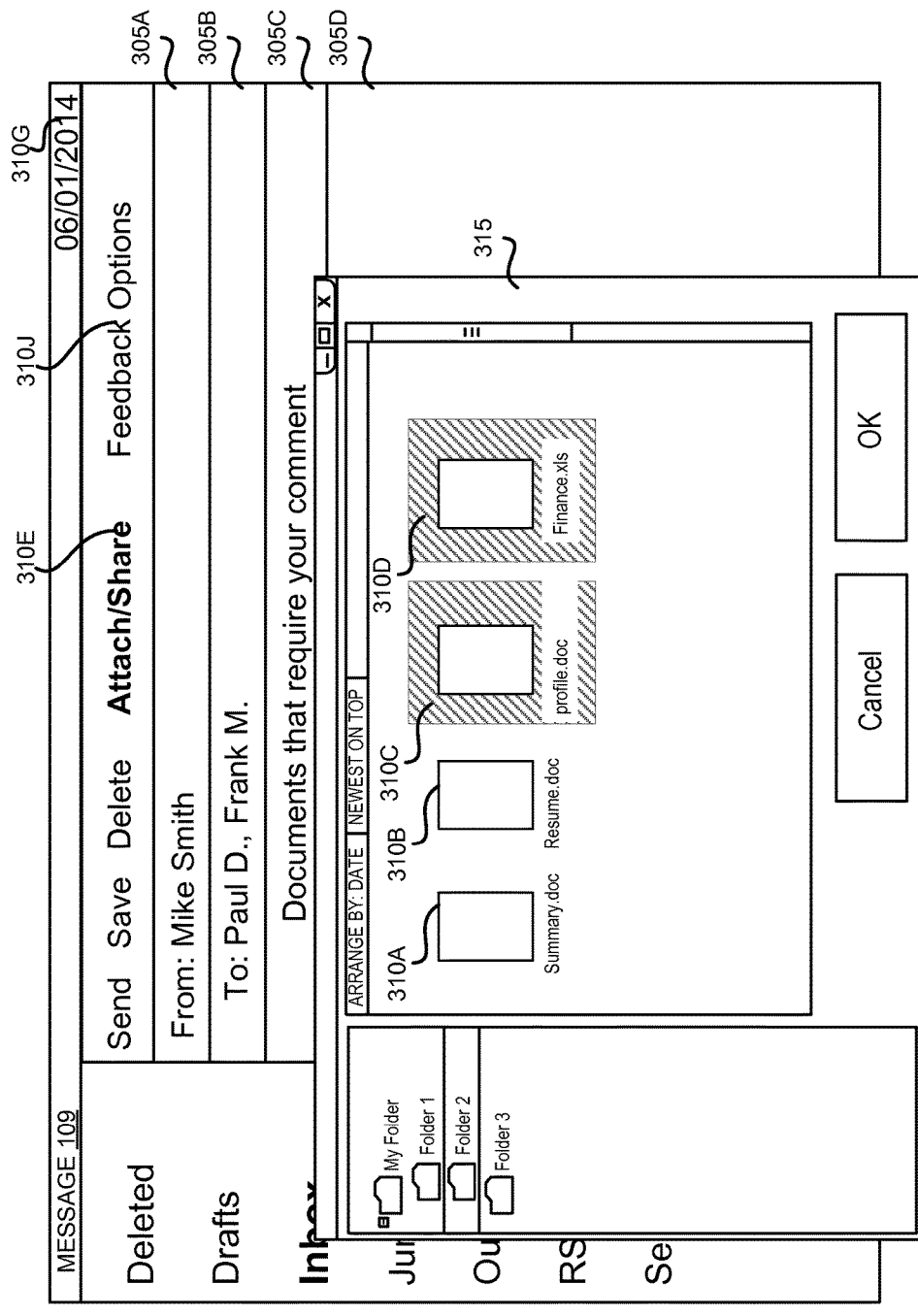
FIG. 3B is a screen diagram showing an illustrative graphical user interface that may display data relating to selecting one or more files to share while composing a message.

FIG. 3B is a screen diagram showing an illustrative graphical UI 300 for displaying a list of stored files 310A-310D and providing controls for allowing a user to select individual files from the displayed list of files 310A-310D. In this example, a file selection UI element 315 is displayed in response to the user selecting the share UI element 310E. As illustrated, the file selection UI element 315 displays a list of stored files 310A-310D. For illustrative purposes, two of the files are highlighted to represent a user selection of two files 113 for sharing. The first selected file 113 is the "profile.doc" file represented by file UI element 310C. The second selected file 113 is the "finance.xls" file represented by file UI element 310D. As can be appreciated, different UI elements, controls or mechanisms may be used to display and select the files to be shared. For example, the graphical UI 300 illustrated in FIG. 3A may be configured to allow a user to drag and drop a selected file to a location within the message 109. Once the user is done selecting the desired files, the selected filed 113 may be associated with the message 109. In addition, the selected files 113 may be attached to the message 109 or uploaded to a service, such as the sharing service 115, for storage.

The "feedback options" UI element 310J provides controls for selecting and/or specifying one or more feedback options 114. In this illustrative example, when the user selects the "feedback options" UI element 310J, the messaging client 111 may generate one or more UI elements or a separate UI displaying controls for allowing the selection of one or more feedback options 114. FIG. 4 illustrates one non-limiting example of UI for displaying feedback options 114 and receiving the selection of one or more feedback options 114.

FIG. 4 is a screen diagram showing an illustrative graphical UI 400 that displays data relating to selecting feedback options 114 for the message 109. The UI 400 may be generated by the messaging client 111, shown in FIG. 1, and presented on a computing device, such as the first computing device 101A or the second computing device 101B by an application, such as a web browser application or the messaging client 111.

In the current example, the UI 400 is an example of a feedback options interface that includes a feedback display settings UI element 401A and a feedback communications settings UI element 401B. The feedback options interface illustrated in the UI 400 are intended for illustration purposes, and are not intended to be limiting. The UI 400 used to specify the feedback options may include more or fewer UI elements.

The feedback display settings UI element 401A includes options to select the categories of feedback data 123 to be included in the message 109. As illustrated, the feedback display settings UI element 401A includes a "display feedback preview" option to include a display of preview of feedback data 123 in the message 109. For example, if the display feedback preview option is selected, one or more categories of feedback data 123, such as comments associated with the selected file 113, may be included in the message 109.

The feedback display settings UI element 401A also lists other categories of feedback data 123 that may be selected by the user. For example, as illustrated in FIG. 4, the feedback display settings UI element 401A includes a "display feedback expiration information" option allowing the selection of feedback expiration information. If the display feedback expiration information option is selected, data indicating an expiration date associated with the feedback data 123 may be included in the message 109.

As also shown in FIG. 4, other feedback options may allow the selection of data describing activity associated with the feedback data 123. For instance, in this example, the feedback display settings UI element 401A includes a "display amount of feedback given to date" option allowing the selection of data indicating the amount of feedback given to date. This category of feedback data 123 may include a number of total comments, a number of comments associated with a particular user, or any other data describing activity associated (also referred to herein as "activity data") with feedback data 123. If the display amount of feedback given to date option is selected, activity data associated with the feedback data 123 may be included in the message 109. As also shown in FIG. 4, other selectable feedback options may allow for the display and communication of other categories of feedback data 123, such as information identifying users associated with the feedback data 123. As will be described below, and shown in FIG. 5 and FIG. 6, any number of categories of feedback data 123 may be selected, retrieved and inserted into the message 109.

As also shown in FIG. 4, the feedback communications settings UI element 401B may include one or more options that enable a user to specify preferences on how the feedback data 123 may be communicated. For instance, as shown in FIG. 4, the user may select the "attach feedback data" option. When the attach feedback data option is selected, the selected categories of feedback data 123 may be retrieved from one or more resources, such as the sharing service 115, and the selected feedback data 123 may be attached to the message 109. If the attach feedback data option is not selected, for example, links configured to provide access to the selected feedback data 123 may be inserted into the message 109. In such an embodiment, a recipient of the message 109 may utilize the links to retrieve the selected feedback data 123 from one or more sources, such as the sharing service 115. These examples of various communication options are provided for illustrative purposes and are not to be construed as limiting.

The feedback communications settings UI element 401B may also include one or more feedback options that allows feedback data 123 to be received by a UI configured to display a message 109. For illustrative purposes, the UI configured to display a message 109 is also referred to herein as a "message UI." Generally described, the feedback communications settings UI element 401B provides controls that cause the messaging client 111 to generate one or more message UIs configured with a data entry field configured to receive feedback data 123 from a user, such as the recipient of the message 109. The feedback data 123 received by the message UI may be communicated from the messaging client 111 to the sharing service 115 for storage of the feedback data 123. The received feedback data 123 may be associated with, or stored within, one or more files, such as the selected file 113 associated with the message 109. By the use of techniques disclosed herein, feedback data 123 associated with a file 113 may be received at a messaging client 111 interface without requiring users to access multiple applications or multiple interfaces to review and communicate the feedback data 123.

In the illustrative example of FIG. 4, within the feedback communications settings UI element 401B, the selection of a "do not allow feedback from email interface" option causes the generation a message UI that is not configured with a data entry field to receive feedback data 123. The selection of an "allow feedback: no expiration" option causes the generation of a message UI that is configured with a data entry field to receive feedback data 123 for an unlimited period of time. Also, in this example, the selection of an "allow feedback: expires on" option causes generation of a message UI that is configured with a data entry field to receive feedback data 123 for a limited time period. The time period may be defined by one or more parameters, such as an expiration date and expiration time received at the UI 400. In the current example, the user has specified that the message UI may only receive feedback data 123 until the expiration date of Jun. 6, 2014, which is five days from the date the message is being composed.

The selected feedback options 114 may be applied to groups of files 113, individual files 113, portions of the feedback data 123 or any combination thereof. To select different feedback options 114 for different types of data, the UI 400 may be displayed multiple times to allow the selection of feedback options 114 for each type of data. For instance, the UI 400 may be displayed for each of the selected files 113. When the desired feedback options 114 have been specified, the user may select the "OK" button, which may cause the generation and display of UI 500 illustrated in FIG. 5.

Figure 5:
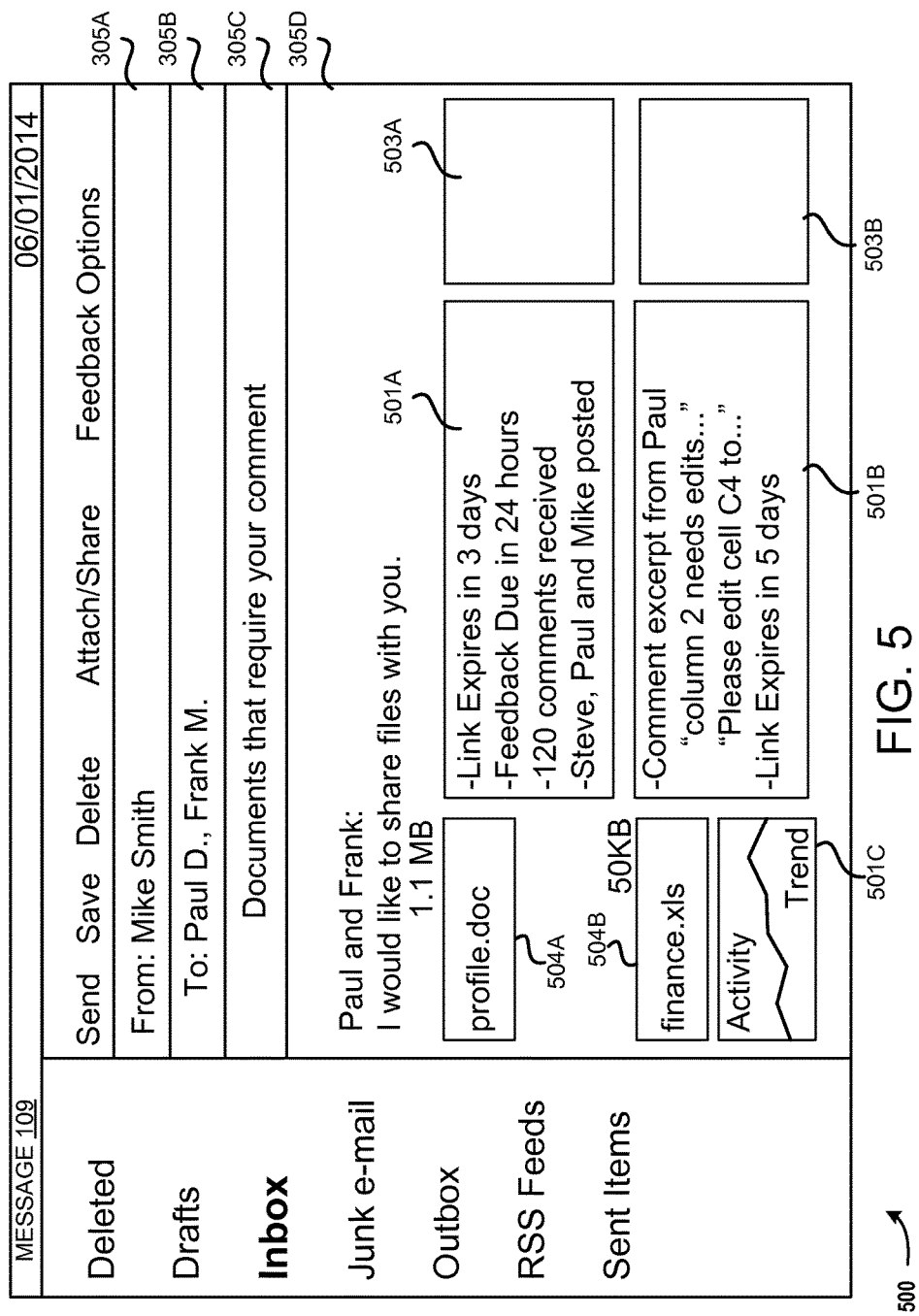
FIG. 5 is a screen diagram showing an illustrative graphical user interface that displays data relating to the message and other graphical elements displaying a sample of selected feedback options.

FIG. 5 is a screen diagram showing an illustrative graphical UI 500 that displays data relating to the message 109 and other graphical elements displaying a sample of selected feedback options 114. The UI 500 may be generated by the messaging client 111, shown in FIG. 1, and presented on a computing device, such as the computing device 101A or computing device 101B by an application, such as a web browser application. As shown, the UI 500 illustrated in FIG. 5 is similar to the UI 300 illustrated in FIG. 3 in that the UI 500 contains the "from" UI element 305A for identifying the sender of the message 109, the "recipient" UI element 305B for identifying the recipients of the message 109, the "subject" UI element 305C for specifying the subject of the message 109, message area UI element 305D for entering text of the message 109. The UI 500 also contains links for the associated files. In this example, a first link 504A is configured to access the file "profile.doc" and a second link 504B is configured to access the file "finance.xls."

As also shown in FIG. 5, the UI 500 includes a first feedback display element 501A, a second feedback display element 501B and a third feedback display element 501C for displaying the selected categories of feedback data 123. For illustrative purposes, the feedback display elements 501A-501C are also referred to herein generically as "feedback display elements 501" or a "feedback display element 501." In some configurations, the feedback display elements 501 include the display of text, images, charts or other types of data. In addition, the feedback display elements 501 may be arranged in one or more positions or layouts to indicate an association with a selected filed.

To illustrate aspects of the feedback display elements 501, it is given that the author of the message 109 selected several categories of feedback data 123 to be included in the message 109. In this example, by the use of an interface, such as UI 400, the selected categories of feedback data 123 for the file "profile.doc" includes activity data, user identification information and data indicating deadlines and expiration dates. In addition, in this example, it is given that the selected categories of feedback data 123 for the file "finance.xls" include comments, user identification information and data indicating expiration dates.

As shown, the position of the first feedback display element 501A shows an association with the file, "profile.doc." In addition, given the selected categories, the first feedback display element 501A displays the text "Link Expires in 3 days" and "Feedback Due in 24 hours." Further, since the author selected a category of feedback data 123 related to user activity, the first feedback display element 501A displays data describing the number comments associated with the file, "profile.doc." In this example, the first feedback display element 501A also displays the text "120 comments received" and "Steve, Paul and Mike posted," which are respectively communicating the user activity and user information.

Also shown in FIG. 5, for illustrative purposes, the position of the second feedback display element 501B shows an association with the file, "finance.xls." As shown, given the selected categories, the second feedback display element 501B displays at least a portion of the feedback data 123, such as a portion of a comment "column 2 needs edits . . . " and "Please edit cell C4 to . . . " In this example, the comments are also displayed with data identifying users that are associated with the comments and data identifying an expiration date. These examples are provided for illustrative purposes and are not to be construed as limiting as any category of feedback data 123 or other related information may be selected, retrieved and displayed in a UI containing a message 109.

The position of the third feedback display element 501C shows an association with the file, "finance.xls." Given the selected categories, the third feedback display element 501C illustrates a graphical chart that may be generated from the activity data. The graphical chart may be generated in response to the selection of one or more categories of feedback data 123, such as the activity data related to the selected file 113. Any category of feedback data 123 may be arranged in a graphical chart or any other arrangement for conveying trends, raw data, projections or any other processed data.

In addition to the display of the feedback display elements 501, the UI 500 may also include elements for receiving feedback data 123. The generation of the elements for receiving feedback data 123 are based on the feedback options 114 received by the user. For illustrative purposes, if the user selected the feedback option 114 labeled as "Allow Feedback: No Expiration" by the use of UI 400, the UI 500 may be configured with elements for receiving feedback data 123. FIG. 5 shows an example of two elements for receiving feedback data 123. Specifically, the UI 500 includes a first data entry element 503A and a second data entry element 503B (also referred to herein generically as "data entry elements 503" or a "data entry element 503"). The data entry elements 503 may include editable text fields configured to receive data from a user and communicate the received data to one or more remote computers. In addition, the data entry elements 503 may include UI elements that allow images, video or other forms of data to be received by the UI 500.

Although the example of FIG. 5 involves the use of the data entry elements 503, the generation of a message UI, e.g., UI 500, may involve the use of graphical representations or placeholders. In some configurations, in the generation of UI 500, graphical representations or placeholders may be generated to show the author the general size, shape and/or position of the data entry elements 503 that will be displayed to the recipient(s) after the message 109 is delivered. Thus, prior to the delivery of the message 109, the UI 500 may include placeholders, and after the delivery of the message, a UI displayed to a recipient of the message 109 may include data entry elements 503. Aspects of the data entry elements 503 configured for receiving feedback data 123 are described in more detail below and also shown in FIG. 6.

Once the author is done composing the message 109 and has selected one or more files 113 and the feedback options 114, the user may send the message 109 to the recipient. As described above, the message 109 may be delivered to a user of another computing device. The message 109 may be delivered using any known techniques for sending a message, which may include the use of a service, such as the messaging service 110.

Figure 6:
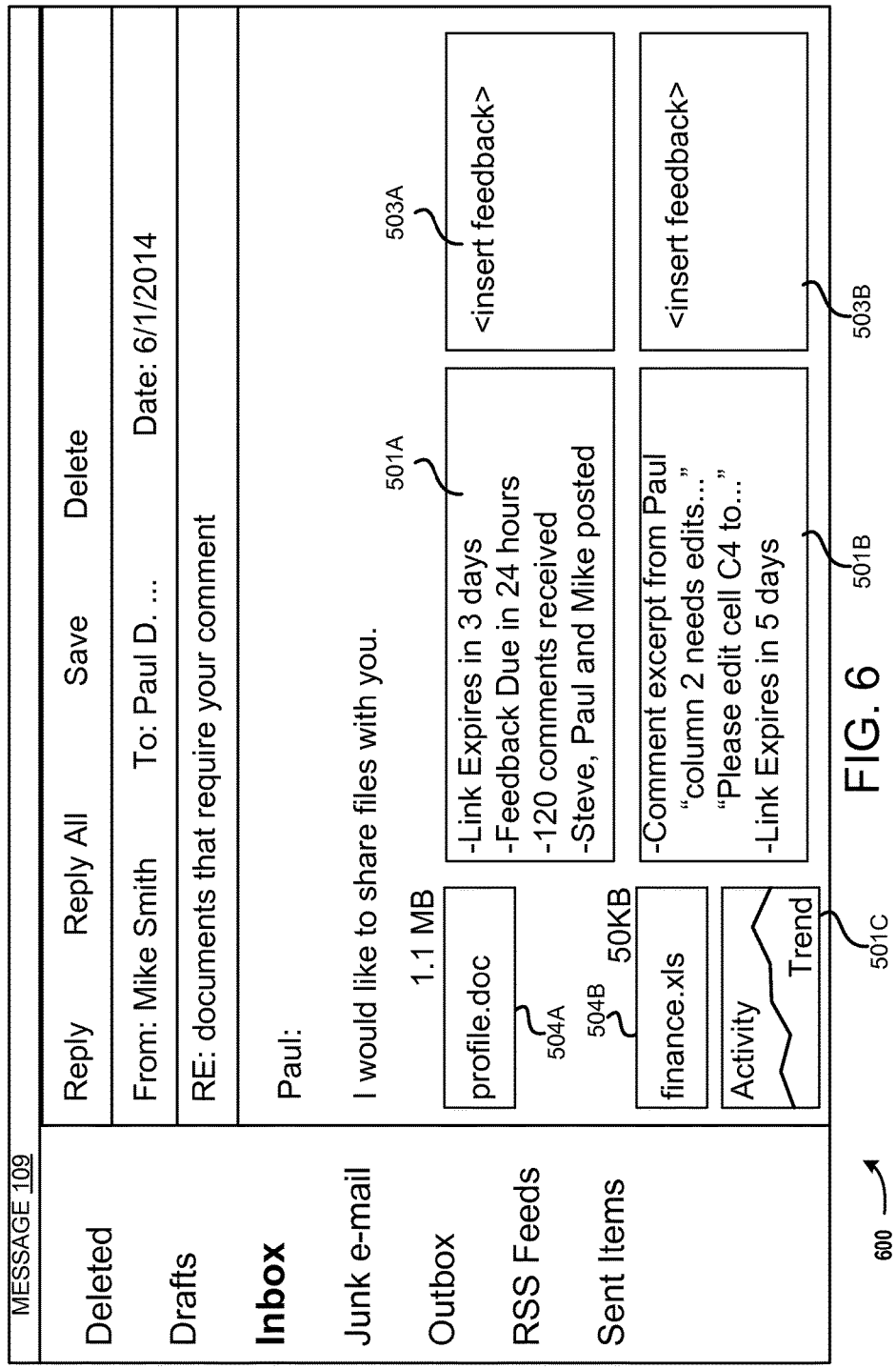
FIG. 6 is a screen diagram showing an illustrative graphical user interface that displays data relating to the message after the message has been delivered to a recipient.

FIG. 6 is a screen diagram showing an illustrative graphical UI 600 that displays data relating to the message 109 after the message 109 has been delivered to a recipient. As shown, the graphical UI 600 that displays the message 109 and other graphical elements displaying the selected feedback options 114. Specifically, the UI 600 includes the feedback display elements 501 for displaying the selected categories of feedback data 123. In addition, the UI 600 displays the data entry elements 503. The feedback data 123 displayed to the recipient by the UI 600 may be accessed by the use of links to the feedback data 123, or the feedback data 123 may be delivered with the message 109 as described above. The links to the feedback data 123 may be represented by the use of any UI element, such as elements 501A-501C. In some configurations, the elements 501A-501C may display a portion of the selected feedback data 123, and a selection of the elements 501A-501C may cause the messaging client 111 to retrieve the selected feedback data 123 or additional feedback data 123. As shown, the UI 600 may also include file links 504 to the selected files 113. The file links 504 may be configured to allow the recipient of the message 109 to access the selected files.

The data entry elements 503 of the UI 600 are configured to receive data, such as text, and communicate the received data to one or more remote computers. In some configurations, the received data may be stored as feedback data 123, which may be stored in a file 113 associated with the data entry elements 503. As described above, the received data may also be stored as feedback data 123 in one or more databases such as the directory 108B of the sharing service 115 or the directory 108A of messaging service 110.

Figure 7:
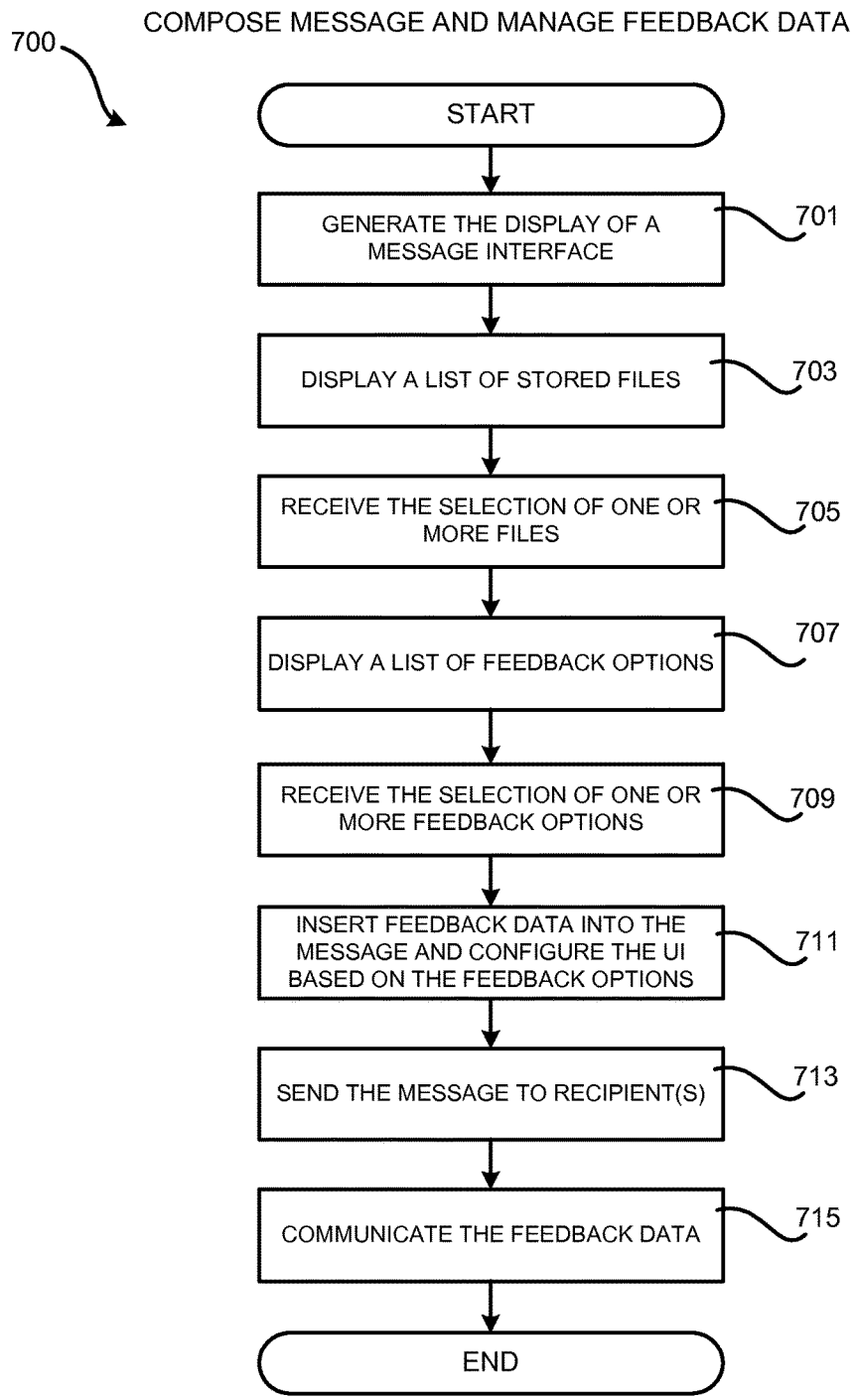
FIG. 7 is a flow diagram showing a routine illustrating aspects of a mechanism disclosed herein for managing document feedback on a sharing service using a messaging client.

FIG. 7 is a flow diagram showing routines that illustrate aspects of techniques for managing document feedback on a sharing service using a messaging client, according to examples disclosed herein. It should be appreciated that the logical operations described herein with respect to FIG. 7, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic and any combination thereof. It should also be appreciated that more or fewer operations may be performed than shown in the FIGS. and described herein. These operations may also be performed in parallel, or in a different order than those described herein.

FIG. 7 is a flow diagram showing a routine 700 illustrating aspects of a mechanism disclosed herein for managing document feedback on a sharing service using a messaging client. The routine 700 may begin at operation 701, where the messaging client 111 and/or the messaging service 110 may display a message interface on a computing device 101. As described above, the message interface may include UI elements for composing and communicating data, such as a message 109. In addition, as will be described herein in more detail below, the message interface may include one or more controls for selecting files to be associated with the message 109.

Next, at operation 703, the messaging client 111 may display a list of stored files. As described above, the list of stored files may include locally stored files 113 or remotely stored files 113. In some configurations, operation 703 may involve a query to obtain a list of file names from a local memory, such as a hard drive of the client computer 101. In addition, operation 703 may involve a query to obtain a list of file names from a service, such as the sharing service 115. The file names may be displayed on a UI, as described above and shown in FIG. 3A. Although a UI having file names and graphical representations of the files 113 are shown herein, it can be appreciated that these examples are provided or illustrative purposes and are not to be construed as limiting to a particular type of interface. For example, the API 112 described in FIG. 1, or some other interface (e.g., speech) may be utilized.

Next, at operation 705, the messaging client 111 may receive a selection of one or more files to be associated with the message 109 and shared with one or more recipients of the message 109. As described above, in some configurations, one or more UIs may be configured to receive a user selection of one or more files 113 from the list of files. Graphical representations may be used to highlight selected files and one or more controls may be used to confirm the selection of the one or more files 113. In addition, drag and drop UI features and other selection features may enable aspects of operation 705.

Next, at operation 707, the messaging client 111 may display a list of feedback options 114. As described above, one or more feedback options 114 may be displayed on a UI, such as UI 400. The display of feedback options 114 may include a number of categories of feedback data 123. For example, as shown in FIG. 4, the categories of feedback data 123 may include comments associated with a file 113, data identifying users who provided comments, data indicating one or more deadlines or expiration dates. Other categories of feedback data 123, for example, may include numbers, tables and/or charts showing frequency data, trends or other data describing activity related to the feedback data 123.

In addition, the display of feedback options 114 may include communication options for the feedback data 123. As described above, and shown in FIG. 4, options displayed on UI 400 present different mechanisms for communicating feedback data 123 with a message 109, and mechanisms for allowing a message UI, such as UI 600, to receive feedback data 123.

Next, at operation 709, the messaging client 111 may receive a selection of one or more feedback options 114. As described above and shown in FIG. 4, the selection of one or more feedback options may include the selection of one or more categories of feedback data 123 to be displayed in a message 109. As noted in the examples described above, the selection of one or more categories may include comments, activity data, user information or any other portion of the feedback data 123. In addition, the selection of one or more feedback options may include the selection of one or more mechanisms for communicating the feedback data 123. As noted in the examples described above, the selection of one or more mechanisms for communicating the feedback data 123 may include options for generating a message UI configured to receive feedback data 123. These examples of selected feedback options 114 are provide for illustrative purposes and are not to be construed as limiting.

Upon the completion of operation 709, the routine 700 proceeds to operation 711 where the messaging service 110 and/or the messaging client 111 inserts feedback data 123 into the message interface or a message 109 based on the selected feedback options 114. As described above and shown in FIG. 5, operation 709 may involve the insertion of selected categories of feedback data 123 into the message 109. Operation 709 may also involve the generation of one or more UI elements for receiving feedback data 123 within the message 109. The feedback data 123 and the elements for receiving feedback data 123 may be integrated into any portion of the message interface, including a body of a message 109 that is being composed by the user. As summarized above, the feedback data 123 may be communicated with the message 109 as an attachment. In some configurations, operation 709 may involve the generation of links that are operable for retrieving the selected categories of the feedback data 123. In operation 709, the links may be inserted in the message 109, a message UI or other interface presented to a user.

From operation 711, the routine 700 may proceed to operation 713, where the message 109 is communicated to one or more recipients. In operation 713, the message 109 may be sent by the messaging service 110 to the recipients of the message 109. As described above, the message 109 may include portions of the feedback data 123 or links to the feedback data 123. In addition, the message 109 may include links 122 and/or other identifiers that provide access to the selected files 113.

Next, at operation 715, messaging client 111 may communicate feedback data 123 with one or more resources. As described above, a message UI may be configured to receive feedback data 123 from a user. For instance, the UI 600 of FIG. 6 includes a message 109 and data entry elements 503 for receiving feedback data 123. When data is received from a user at the data entry element 503, the received data may be communicated from a computer, such as the client computer 101, to one or more computers, such as the sharing service 115. As also described above, the data received by the data entry element 503 may be stored within a file 113 as feedback data 123. In addition, the received data may be stored in a database or data store such as the directory 108A of the messaging service 110 or the directory 108B of the sharing service 115.

In addition, operation 715 may involve the communication of feedback data 123 from a remote computing device, such as the sharing service 115, to the client computer 101. This may occur if the message 109 is configured with links for accessing the feedback data 123. As described above, in some configurations, the feedback data 123 may be communicated with message 109 as an attachment or the feedback data 123 maybe communicated by the use of one or more links embedded in the message 109. In configurations where links to the feedback data 123 are embedded in the message 109, operation 715 may involve the communication of feedback data 123 from the sharing service 115 to a client computer 101. For instance, the third feedback display element 501C, which is a chart of feedback data 123, may be downloaded by the client computing device when the message 109 is viewed or when the data is requested by the messaging client 111. These examples are provided for illustrative purposes and not to be construed as limiting. Upon the completion of operation 715, the routine 700 terminates.

Figure 8:
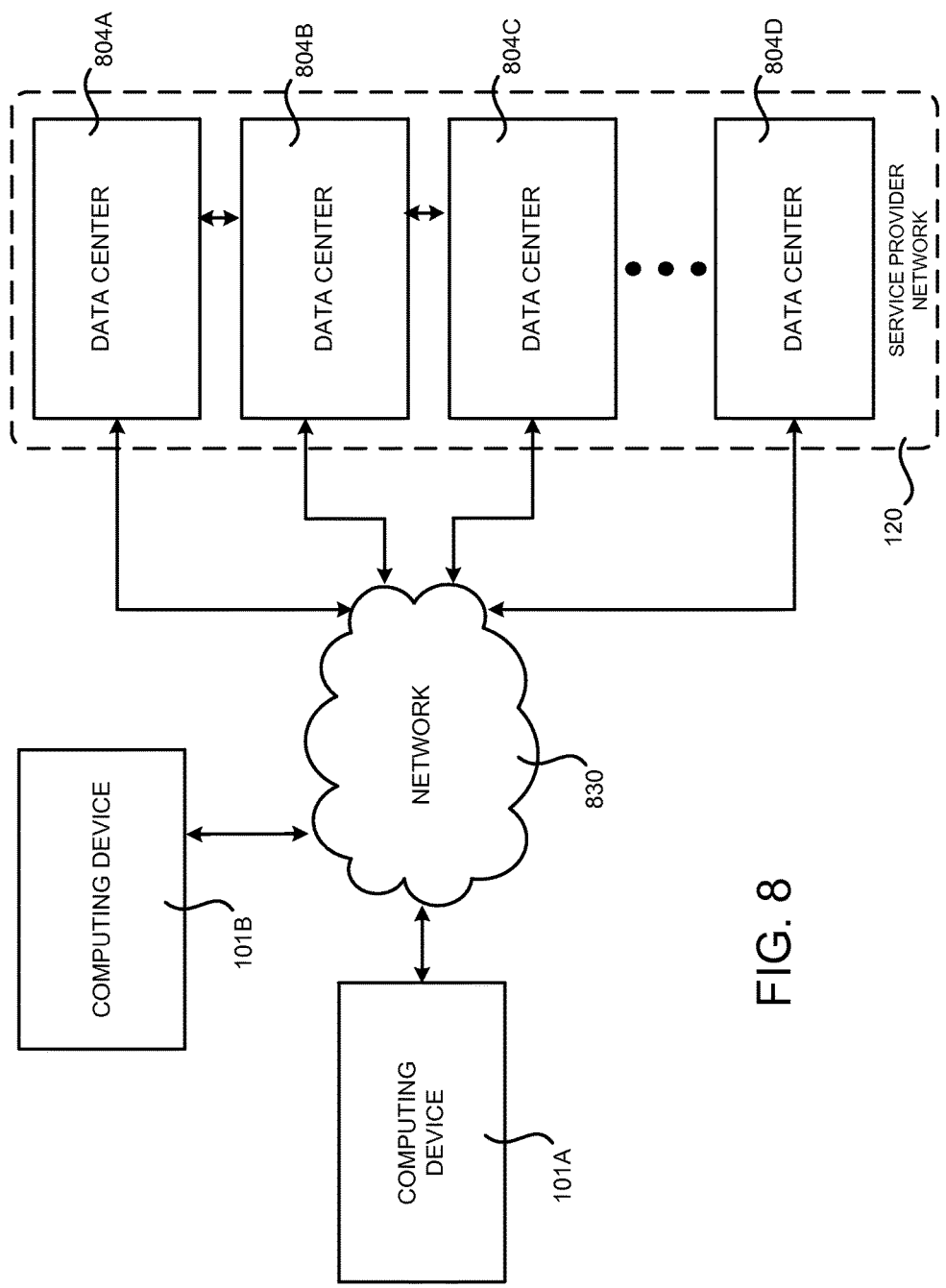
FIG. 8 is a system and network diagram that shows one illustrative operating environment for examples disclosed herein that includes a service provider network.

FIG. 8 and the following description are intended to provide a brief, general description of a suitable computing environment in which the technologies described herein may be implemented. In particular, FIG. 8 is a system and network diagram that shows an illustrative operating environment that includes a service provider network 120. As discussed above, the service provider network 120 can provide virtual machine instances and computing resources on a permanent or an as-needed basis.

The computing resources provided by the service provider network 120 may include various types of resources, such as data processing resources, data storage resources, networking resources, data communication resources and the like. Each type of computing resource may be general-purpose or may be available in a number of specific configurations. For example, and as will be described in greater detail below, data processing resources may be available as virtual machine instances in a number of different configurations. The virtual machine instances may be configured to execute applications, including Web servers, application servers, media servers, database servers and other types of applications. Data storage resources may include file storage devices, block storage devices and the like. Each type or configuration of a virtual machine instance of a computing resource may be available in different sizes, such as large resources, consisting of many processors, large amounts of memory, and/or large storage capacity, and small resources consisting of fewer processors, smaller amounts of memory and/or smaller storage capacity.

The computing resources provided by the service provider network 120 are enabled in one implementation by one or more data centers 804A-804N (which may be referred to herein singularly as "a data center 804" or collectively as "the data centers 804"). The data centers 804 are facilities utilized to house and operate computer systems and associated components. The data centers 804 typically include redundant and backup power, communications, cooling and security systems. The data centers 804 might also be located in geographically disparate locations. One illustrative configuration for a data center 804 that implements some or all of the concepts and technologies disclosed herein for annotating resources in the service provider network 120 will be described below with regard to FIG. 9.

The users and customers of the service provider network 120 may access the computing resources provided by the data centers 804 over a suitable data communications network, such as a Wide Area Network ("WAN"), as illustrated by the network 830. Although a WAN might be used, it should be appreciated that a local-area network ("LAN"), the Internet, or any other networking topology known in the art that connects the data centers 804 to the computing device 101A, and the computing device 101B may be utilized. It should also be appreciated that combinations of such networks might also be utilized.

Figure 9:
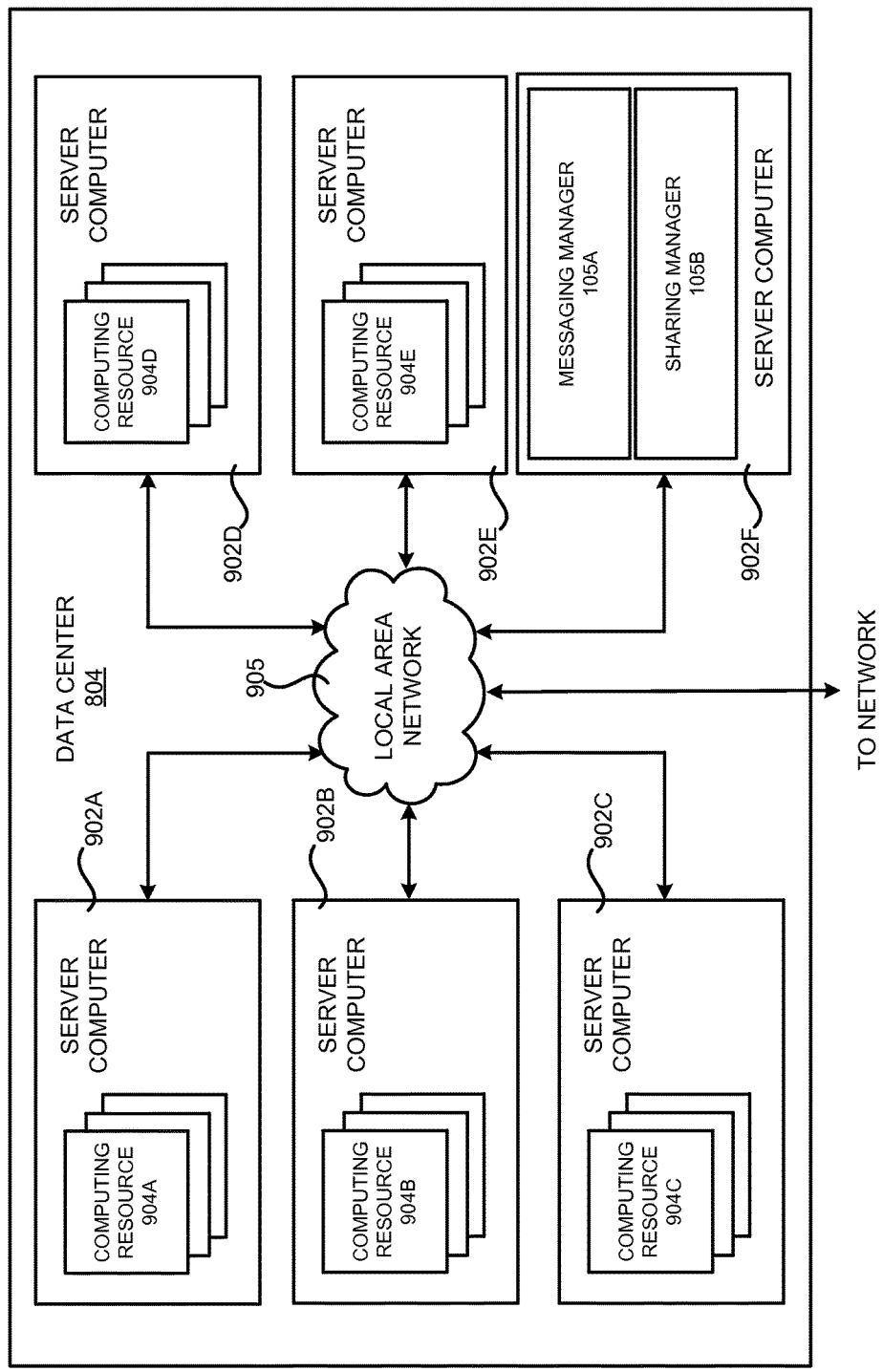
FIG. 9 is a computing system diagram that illustrates one configuration for a data center that implements aspects of the concepts and technologies disclosed herein for managing document feedback on a sharing service using a messaging client.

FIG. 9 is a computing system diagram that illustrates one configuration for a data center 804 that implements aspects of a service provider network 120, including some or all of the concepts and technologies disclosed herein for managing document feedback on a sharing service using a messaging client 111. The example data center 804 shown in FIG. 9 includes several server computers 902A-902F (which may be referred to herein singularly as "a server computer 902" or in the plural as "the server computers 902") for providing computing resources. The server computers 902 may be standard tower or rack-mount server computers configured appropriately for providing the computing resources described herein. According to one configuration, the server computers 902 are configured to execute the software products as described above.

In one example, some of the computing resources 904 are virtual machine instances. As known in the art, a virtual machine instance is an instance of a software implementation of a machine (i.e. a computer) that executes programs like a physical machine. Each of the server computers 902 may be configured to execute an instance manager (not shown) capable of instantiating and managing computing resources and instances of computing resources. In the case of virtual machine instances, for example, the instance manager might be a hypervisor or another type of program configured to enable the execution of multiple virtual machine instances on a single server computer 902, for example.

It should be appreciated that although the technologies disclosed herein are described primarily in the context of virtual machine instances, other types computing resources can be utilized with the concepts and technologies disclosed herein. For instance, the technologies disclosed herein might be utilized with hardware resources, data storage resources, data communications resources, networking resources, database resources and with other types of computing resources.

The data center 804 shown in FIG. 9 also includes a server computer 902F reserved for executing software components for managing the operation of the data center 804, server computers 902, virtual machine instances, and other resources within the service provider network 120. The server computer 902F might also execute the messaging manager 105A and/or the sharing manager 105B. Details regarding the operation of each of these components has been provided above. In this regard, it should be appreciated that while these components are illustrated as executing within the service provider network 120, computing systems that are external to the service provider network 120 might also be utilized to execute some or all of these components. Other configurations might also be utilized.

In the example data center 804 shown in FIG. 9, an appropriate local area network ("LAN") 905 is utilized to interconnect the server computers 902A-902E and the server computer 902F. The LAN 905 is also connected to the network 830 illustrated in FIG. 8. It should be appreciated that the configuration and network topology illustrated in FIGS. 8 and 9 has been greatly simplified and that many more computing systems, networks and networking devices may be utilized to interconnect the various computing systems disclosed herein. Appropriate load balancing devices or software modules might also be utilized for balancing a load between each of the data centers 804A-804N, between each of the server computers 902A-902F in each data center 804 and between virtual machine instances and other types of computing resources provided by the service provider network 120.

It should be appreciated that the data center 804 described in FIG. 9 is merely illustrative and that other implementations might also be utilized. Additionally, it should be appreciated that the functionality provided by these components might be implemented in software, hardware, or a combination of software and hardware. Other implementations should be apparent to those skilled in the art.

Figure 10:
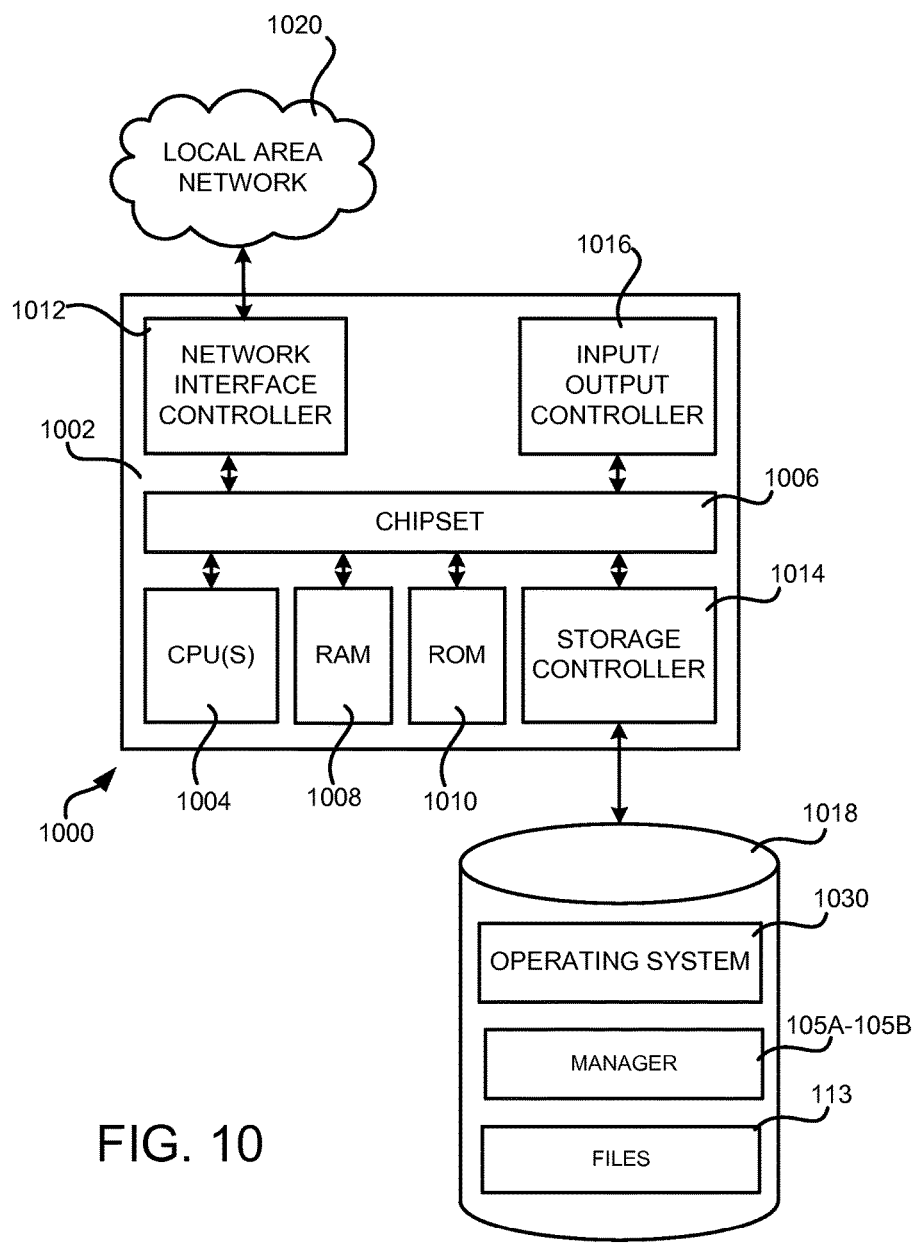
FIG. 10 is a computer architecture diagram showing an illustrative computer hardware architecture for implementing a computing device that might be utilized to implement aspects of the various technologies presented herein.

FIG. 10 shows an example computer architecture for a computer 1000 capable of executing program components for managing document feedback on a sharing service using a messaging client in the manner described above. The computer architecture shown in FIG. 10 illustrates a conventional server computer, workstation, desktop computer, laptop, tablet, network appliance, personal digital assistant ("PDA"), e-reader, digital cellular phone, or other computing device, and may be utilized to execute any of the software components presented herein. For example, the computer architecture shown in FIG. 10 may be utilized to execute software components for performing operations as described above. The computer architecture shown in FIG. 10 might also be utilized to implement a computing device 101A or 101B or any other of the computing systems described herein.

The computer 1000 includes a baseboard 1002, or "motherboard," which is a printed circuit board to which a multitude of components or devices may be connected by way of a system bus or other electrical communication paths. In one illustrative configuration, one or more central processing units ("CPUs") 1004 operate in conjunction with a chipset 1006. The CPUs 1004 may be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements may generally include electronic circuits that maintain one of two binary states, such as flip-flops and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

The chipset 1006 provides an interface between the CPUs 1004 and the remainder of the components and devices on the baseboard 1002. The chipset 1006 may provide an interface to a RAM 1008, used as the main memory in the computer 1000. The chipset 1006 may further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM may also store other software components necessary for the operation of the computer 1000 in accordance with the various configurations described herein.

The computer 1000 may operate in a networked environment using logical connections to remote computing devices and computer systems through a network, such as the local area network 1020. The chipset 1006 may include functionality for providing network connectivity through a network interface controller (NIC) 1012, such as a gigabit Ethernet adapter. The NIC 1012 is capable of connecting the computer 1000 to other computing devices over the local area network 1020. It should be appreciated that multiple NICs 1012 may be present in the computer 1000, connecting the computer to other types of networks and remote computer systems.

The computer 1000 may be connected to a mass storage device 1018 that provides non-volatile storage for the computer. The mass storage device 1018 may store system programs, application programs, other program modules and data, which have been described in greater detail herein. The mass storage device 1018 may be connected to the computer 1000 through a storage controller 1014 connected to the chipset 1006. The mass storage device 1018 may consist of one or more physical storage units. The storage controller 1014 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 may store data on the mass storage device 1018 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1018 is characterized as primary or secondary storage and the like.

For example, the computer 1000 may store information to the mass storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 may further read information from the mass storage device 1018 by detecting the physical states or characteristics of one or more particular locations within the physical storage units.

In addition to the mass storage device 1018 described above, the computer 1000 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 1000.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 1018 may store an operating system 1030 utilized to control the operation of the computer 1000. According to one example, the operating system comprises the LINUX operating system. According to another example, the operating system comprises the WINDOWS® SERVER operating system from MICROSOFT Corporation. According to further examples, the operating system may comprise the UNIX operating system. It should be appreciated that other operating systems may also be utilized. The mass storage device 1018 may store other system or application programs and data utilized by the computer 1000, such as components that include the managers 105A-105B, the files 113, and/or any of the other software components and data described above. The mass storage device 1018 might also store other programs and data not specifically identified herein.

In one example, the mass storage device 1018 or other computer-readable storage media is encoded with computer-executable instructions which, when loaded into the computer 1000, transform the computer from a general-purpose computing system into a special-purpose computer capable of implementing the examples described herein. These computer-executable instructions transform the computer 1000 by specifying how the CPUs 1004 transition between states, as described above. According to one configuration, the computer 1000 has access to computer-readable storage media storing computer-executable instructions which, when executed by the computer 1000, perform the various routines described above with regard to FIG. 7. The computer 1000 might also include computer-readable storage media for performing any of the other computer-implemented operations described herein.

The computer 1000 may also include one or more input/output controllers 1016 for receiving and processing input from a number of input devices, such as a keyboard, a mouse, a touchpad, a touch screen, an electronic stylus, or other type of input device. Similarly, the input/output controller 1016 may provide output to a display, such as a computer monitor, a flat-panel display, a digital projector, a printer, a plotter, or other type of output device. It will be appreciated that the computer 1000 may not include all of the components shown in FIG. 10, may include other components that are not explicitly shown in FIG. 10, or may utilize an architecture completely different than that shown in FIG. 10.

Based on the foregoing, it should be appreciated that technologies for managing document feedback on a sharing service using a messaging client have been presented herein. Moreover, although the subject matter presented herein has been described in language specific to computer structural features, methodological acts and computer readable media, it is to be understood that the invention defined in the appended claims is not necessarily limited to the specific features, acts, or media described herein. Rather, the specific features, acts and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example configurations and applications illustrated and described, and without departing from the true spirit and scope of the present invention, which is set forth in the following claims.

What is claimed is:

1. A computer-implemented method, comprising:
   causing a display of a message interface associated with a message client, the message interface configured to compose an electronic message that is to be delivered by a messaging service from a sender to a recipient and to display files and comments about the files, wherein the files and the comments are stored by and shared by a sharing service that is separate from the messaging service;
   receiving a first selection of one or more files of the files;
   causing a display of a feedback options interface within the message interface, wherein the feedback options interface presents display options and communication options for the comments for the one or more files, the display options including types of data associated with the comments to display in the electronic message including data defining an amount of user activity relating to the one or more files and data indicating one or more deadlines or expiration dates for feedback relating to the one or more files, the communication options including whether to allow the electronic message to receive additional comments about the one or more files as text data within one or more editable text fields of the electronic message;
   receiving a second selection of one or more of the display options;
   receiving at least a portion of the comments and the data associated with the comments based, at least in part, on the selection of the one or more display options, wherein the portion of the comments is received from the one or more files as stored on the sharing service;
   inserting the portion of the comments and the data associated with the comments in the electronic message;
   receiving a third selection of one or more of the communication options for the comments including whether to allow the additional comments about the one or more files from within the electronic message; and
   inserting the one or more editable text fields in the electronic message based, at least in part, on selection of the one or more communication options, wherein the one or more editable text fields are configured to receive from the sender the additional comments to be communicated to the sharing service for integration of the additional comments into the one or more files.

2. The computer-implemented method of claim 1, further comprising:
   generating a hyperlink for accessing the comments of the one or more files stored on the sharing service based, at least in part, on the one or more communication options for the comments; and
   sending the electronic message to the recipient, wherein the one or more editable text fields are further configured to receive from the recipient further comments about the one or more files to be communicated to the sharing service for integration of the further comments with the one or more files.

3. The computer-implemented method of claim 1, further comprising:
generating a chart based, at least in part, on the comments and the one or more display options; and
inserting the chart into the electronic message, wherein the chart depicts frequency data or trends describing activity related to the comments.

4. The computer-implemented method of claim 1, further comprising:
receiving the additional comments from the user via the one or more editable text fields; and
communicating the additional comments to the sharing service for inclusion in the one or more files stored on the sharing service.

5. An apparatus, comprising:
at least one processor; and
a non-transitory computer-readable storage medium having computer-executable instructions stored thereon which, when executed on the at least one processor, cause the apparatus to
display a message interface associated with a message client, the message interface configured to compose an electronic message that is to be delivered by a messaging service from a sender to a recipient,
receive a first selection of a file associated with files stored by and shared by a sharing service that is separate from the messaging service,
display a feedback options interface within the message interface, wherein the feedback options interface presents display options and communication options for comments about the file, the display options including types of data associated with the comments to display in the electronic message including data defining an amount of user activity relating to the one or more files and data indicating one or more deadlines or expiration dates for feedback relating to the one or more files, the communication options including whether to allow the electronic message to receive additional comments about the file as text data within an editable text field of the electronic message,
receive a second selection of one or more of the display options,
insert a portion of the comments and the data associated with the comments in the electronic message based, at least in part, on the second selection of the one or more of the display options, wherein the portion of the comments is received from the one or more files as stored on the sharing service,
receive a third selection of one or more of the communication options for the comments including whether to allow the additional comments about the one or more files from within the electronic message, and
insert the editable text field in the electronic message based, at least in part, on selection of the one or more communication options, wherein the editable text field is configured to receive from the sender the additional comments to be communicated to the sharing service for integration of the additional comments into the file.

6. The apparatus of claim 5, wherein the instructions further cause the apparatus to:

generate a hyperlink for accessing the comments of the file based, at least in part, on the one or more communication options for the comments; and
send the electronic message to the recipient, wherein the one or more editable text fields are further configured to receive from the recipient further comments about the one or more files to be communicated to the sharing service for integration of the further comments with the one or more files.

7. The apparatus of claim 5, wherein the instructions further cause the apparatus to:
generate a chart based, at least in part, on the comments and the one or more display options; and
insert the chart into the electronic message, wherein the chart depicts frequency data or trends describing activity related to the comments.

8. The apparatus of claim 5, wherein the communication options include a choice to prevent the additional comments from being provided in the electronic message when displayed within the user interface of the recipient.

9. A non-transitory computer-readable storage medium having computer-executable instructions stored thereupon which, when executed by a computer, cause the computer to:
display a message interface associated with a message client, the message interface configured to compose an electronic message that is to be delivered by a messaging service from a sender to a recipient;
receive a first selection of one or more files from a plurality of files stored by and shared by a sharing service that is separate from the messaging service;
display a feedback options interface within the message interface, wherein the feedback options interface presents display options and communication options for comments about the file, the display options including types of data associated with the comments to display in the electronic message including data defining an amount of user activity relating to the one or more files and data indicating one or more deadlines or expiration dates for feedback relating to the one or more files, the communication options including whether to allow the electronic message to receive additional comments about the file as text data within an editable text field of the electronic message;
receive a second selection of one or more of the display options;
insert a portion of the comments and the data associated with the comments in the electronic message based on, at least in part, the second selection of the one or more of the display options, wherein the portion of the comments is received from the one or more files as stored on the sharing service;
receive a third selection of one or more of the communication options for the comments including whether to allow the additional comments about the one or more files from within the electronic message; and
insert the editable text field in the electronic message based, at least in part, on selection of the one or more communication options, wherein the editable text field is configured to receive from the sender the additional comments to be communicated to the sharing service for integration of the additional comments into the one or more files.

10. The non-transitory computer-readable storage medium of claim 9, having further computer-executable instructions stored thereon that cause the computer to:

generate a hyperlink for accessing the comments of the one or more files based, at least in part, on the one or more communication options for the comments; and send the electronic message to the recipient, wherein the one or more editable text fields are further configured to receive from the recipient further comments about the one or more files to be communicated to the sharing service for integration of the further comments with the one or more files.

11. The non-transitory computer-readable storage medium of claim 9, having further computer-executable instructions stored thereon that cause the computer to:

generate a chart based, at least in part, on the comments and the one or more display options; and insert the chart into the electronic message, wherein the chart depicts frequency data or trends describing activity related to the comments.

12. The computer-implemented method of claim 1, wherein the communication options include whether to attach the comments to the electronic message.

13. The apparatus of claim 5, wherein the communication options include whether to attach the comments to the electronic message.

14. The non-transitory computer-readable storage medium of claim 9, wherein the communication options include whether to attach the comments to the electronic message.

\* \* \* \* \*